(12) United States Patent
Ozawa et al.

(10) Patent No.: US 8,035,054 B2
(45) Date of Patent: Oct. 11, 2011

(54) VACUUM INSULATED SWITCHGEAR

(75) Inventors: Hiroyuki Ozawa, Hitachi (JP); Kenji Tsuchiya, Hitachi (JP); Masato Kobayashi, Hitachi (JP); Ayumu Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 475 days.

(21) Appl. No.: 12/339,323

(22) Filed: Dec. 19, 2008

(65) Prior Publication Data

US 2009/0159568 A1   Jun. 25, 2009

(51) Int. Cl.
*H01H 33/74* (2006.01)
(52) U.S. Cl. ............................. 218/55; 218/68; 218/79
(58) Field of Classification Search ................ 218/55, 218/68, 79
See application file for complete search history.

(56) References Cited

U.S. PATENT DOCUMENTS

| 4,587,390 A * | 5/1986 | Gray ............................. 200/400 |
| 6,242,708 B1 * | 6/2001 | Marchand et al. ............ 218/153 |
| 6,504,125 B2 * | 1/2003 | Nishitani ........................ 218/68 |

FOREIGN PATENT DOCUMENTS

| JP | 2005-354880 A | 12/2005 |
| JP | 2006-320196 A | 11/2006 |
| JP | 2007-014086 | 1/2007 |
| JP | 2007-014087 | 1/2007 |
| JP | 2007-97376 A | 4/2007 |

* cited by examiner

*Primary Examiner* — Truc Nguyen
(74) *Attorney, Agent, or Firm* — Mattingly & Malur, PC

(57) ABSTRACT

A vacuum insulated switchgear having a vacuum container, a fixed contact disposed in the vacuum container, a movable contact disposed in the vacuum container capable of being in contact with or out of contact with the fixed contact, a driving mechanism for driving the movable contact in directions to contact with and out of contact with the fixed contact, a resin portion molded around the vacuum container, an insulative bushing for covering a pulled-out portion of a conductor connected to the fixed contact and for extending from the molded resin portion, and a cable head insulating member for covering a conductor of a cable head connected to the conductor at the pulled-out portion and an outer surface of the cable head insulating member being earthed, characterized in that:
  an earthed conductive member is embedded at least at a position opposite to an end of the cable head insulating member in the bushing.

10 Claims, 12 Drawing Sheets

VACUUM INSULATED SWITCHGEAR

CLAIM OF PRIORITY

The present application claims priority from Japanese patent application JP 2007-331114 filed on Dec. 21, 2007, the content of which is hereby incorporated by reference into this application.

BACKGROUND OF THE INVENTION

1. Field of the Invention

The present invention relates to a vacuum insulated switchgear, specifically, to a technology for suppressing dielectric breakdown of a vacuum insulated switchgear that uses a solid insulation method.

2. Description of Related Art

A power receiving facility has a closed power distribution panel (referred to below as a switchgear at appropriate places) that includes a vacuum breaker for shutting off load current and fault current, a disconnecting switch and an earthing switch for securing safety for an operator who services a load, a detector for detecting a voltage and current in the system, a protective relay, and the like.

This type of switchgear is insulated in various ways; in addition to conventional air insulated panels and cubicle gas insulated switchgears (GISs) that use an SF6 gas, switchgears that use solid insulation, compressed air insulation, and complete vacuum insulation have come on the market in recent years as an aid to solving environmental issues.

For example, Patent Document 1 describes a vacuum insulated switchgear in which a switching portion that integrates shutoff, disconnection, and earthing functions into a vacuum container is solid-insulated by being molded by epoxy resin, and a conductor on a bus side and conductor on a load side that extend from the switching are solid-insulated.

Patent Document 1: Japanese Patent Laid-open No. 2007-14087

SUMMARY OF THE INVENTION

However, it cannot be said that the switchgear described in Patent Document 1 is sufficiently considered against dielectric breakdown that may be caused by the use of the solid insulation method.

Specifically, the vacuum insulated switchgear in Patent Document 1 generates voids (air holes, bubbles, and cavities) on bonding interfaces between insulative bushings and cable head insulating members, the insulative bushing covering a conductor extending from a molded resin portion of the switching, the cable head insulating member covering a conductor of a cable head connected to the extending conductor and also covering the outer periphery of the bushing.

The surface of the cable head insulating member is earthed, so a high electric field between a high potential of the conductor and a ground potential of the cable head insulating member is applied to the voids on the interface between the bushing and the cable head insulating member. As a result, the voids cause partial discharge and thereby the cable head insulating member and other portions are deteriorated, possibly causing dielectric breakdown.

An object of the present invention is to suppress dielectric breakdown that may be caused when a high electric field is applied to a bonding interface between solid insulating members of a vacuum insulated switchgear that uses a solid insulation method.

To solve the problem described above, a vacuum insulated switchgear according to the present invention comprises a vacuum container, fixed contacts disposed in the vacuum container, movable contacts disposed in the vacuum container capable of being in contact with or out of contact with the fixed contacts, a driving mechanism for driving the movable contacts in directions to contact with and out of contact with the fixed contacts, a resin portion molded around the vacuum container, insulative bushings, which are connected to the fixed contacts and cover pulled-out portions of conductors extending from the molded resin portion, and cable heads insulating members, each of which covers a conductor of a cable head connected to the conductor at the pulled-out portion and an outer surface of the cable head insulating member being earthed.

A conductive member, which is earthed, is embedded at least at a position opposite to an end of the cable head insulating member in the bushing.

As described above, voids are generated on the interface between the bushing and the cable head insulating member that covers the bushing. Particularly, a high electric field is applied to voids at the position opposite to an end of the cable head insulating member. However, when the earthed conductive member is embedded at least at the position opposite to the end of the cable head insulating member in the bushing, the electric field applied to the voids can be alleviated. Accordingly, it is possible to suppress partial discharge caused by the high electric field on the voids as well as deterioration of the bushing and cable head insulating member and dielectric breakdown that may be caused by the partial discharge.

The earthed conductive member may be embedded like a ring at the root of the bushing on the molded resin portion side, the end of the cable head insulating member facing the bushing. When the cable head insulating member is placed on the bushing to cover it, a high electric field is likely to be applied to the interface between the root of the bushing and the cable head insulating member. When, however, the conductive member is embedded like a ring into the conductor at the root of the bushing, dielectric breakdown can be effectively suppressed.

When conductive members are embedded into the bushing for the conductor on the bus side and the bushing for the conductor on the load side, dielectric breakdown that may be caused on both the bus side and load side can be suppressed.

It is also possible to form an earthed conductive layer on the outer surface of the molded resin portion and connect the conductive member to the conductive layer.

It is also possible to connect the conductive member embedded into one of the bushings for the bus-side conductor and the load-side conductor to the conductive layer and to use the conductive member embedded into the other bushing as a potential measuring terminal by not to be connected to the conductive layer so that it has a floating potential.

The conductive member having a floating potential does not generate a voltage when not connected to the conductor, and generates a voltage when connected to the conductor. Accordingly, it can be easily determined whether the conductor is connected by, for example, measuring a voltage on the terminal of the conductor or connecting a light emitting diode (LED) and the like to the terminal.

The potential of the potential measuring terminal is sufficiently lower than the voltage applied to the conductor, so an effect of suppressing the high electric field from being applied to the voids can also be derived. The number of components can be reduced when compared with a case in which a specific terminal for determining whether the conductor is connected is provided as in the prior art.

The molded resin portion molded around the vacuum container and the bushing can be integrated into a common body. In this case, it suffices to form an earthed conductive layer on a surface of an area excluding the bushing.

The present invention can suppress dielectric breakdown that may be caused when a high electric field is applied to a bonding interface between solid insulating members of a vacuum insulated switchgear that uses a solid insulation method.

DETAILED DESCRIPTION OF THE PREFERRED EMBODIMENTS

Figure 1:
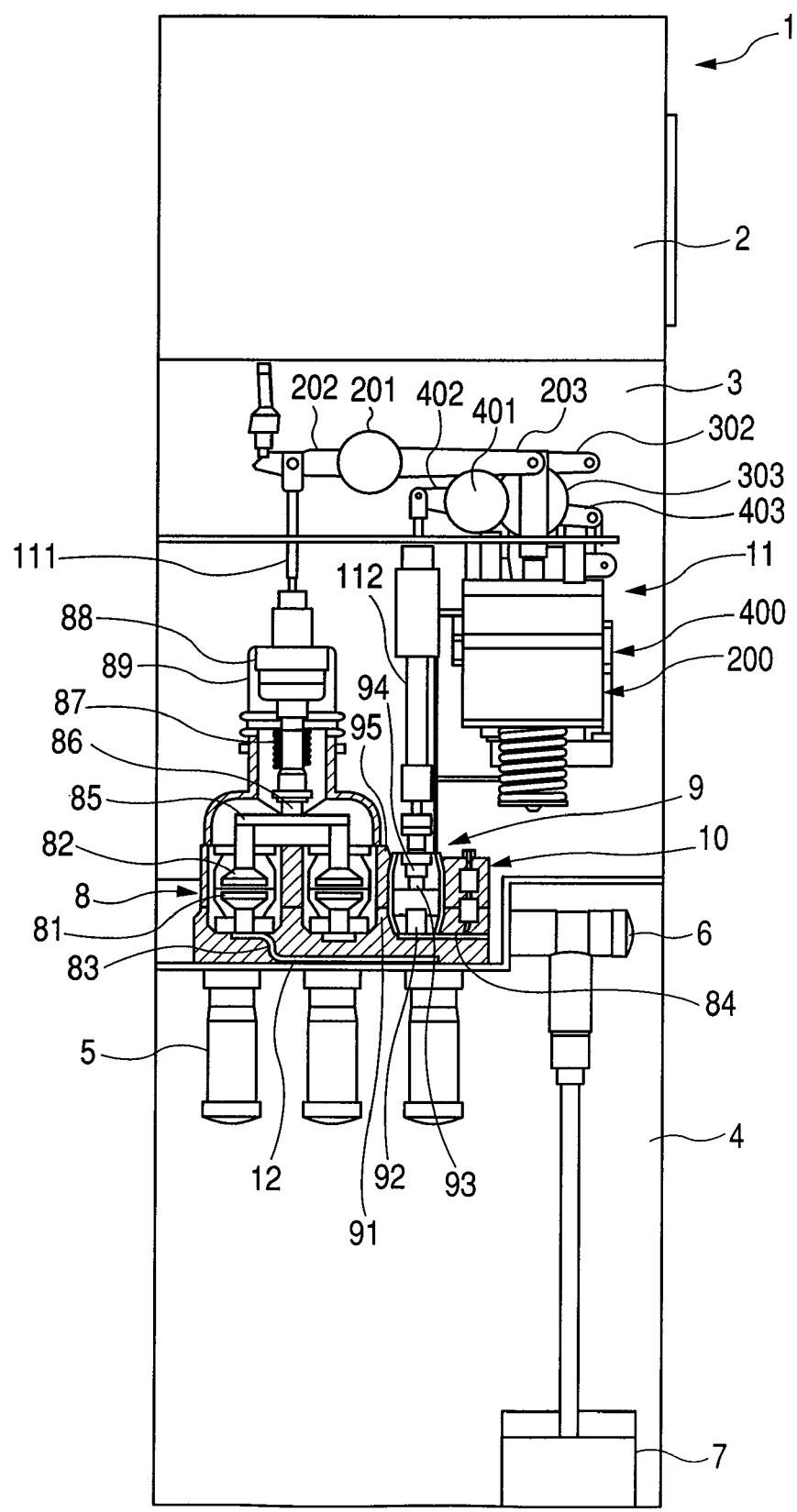
FIG. 1 is a side view showing an embodiment in which a vacuum insulated switchgear of the present invention is applied as a feeder panel.

Embodiments of a vacuum insulated switchgear by applying the present invention will be described with reference to the drawings. In the description that follows, like elements are denoted by like reference numerals to eliminate duplicate explanation.

Figure 2:
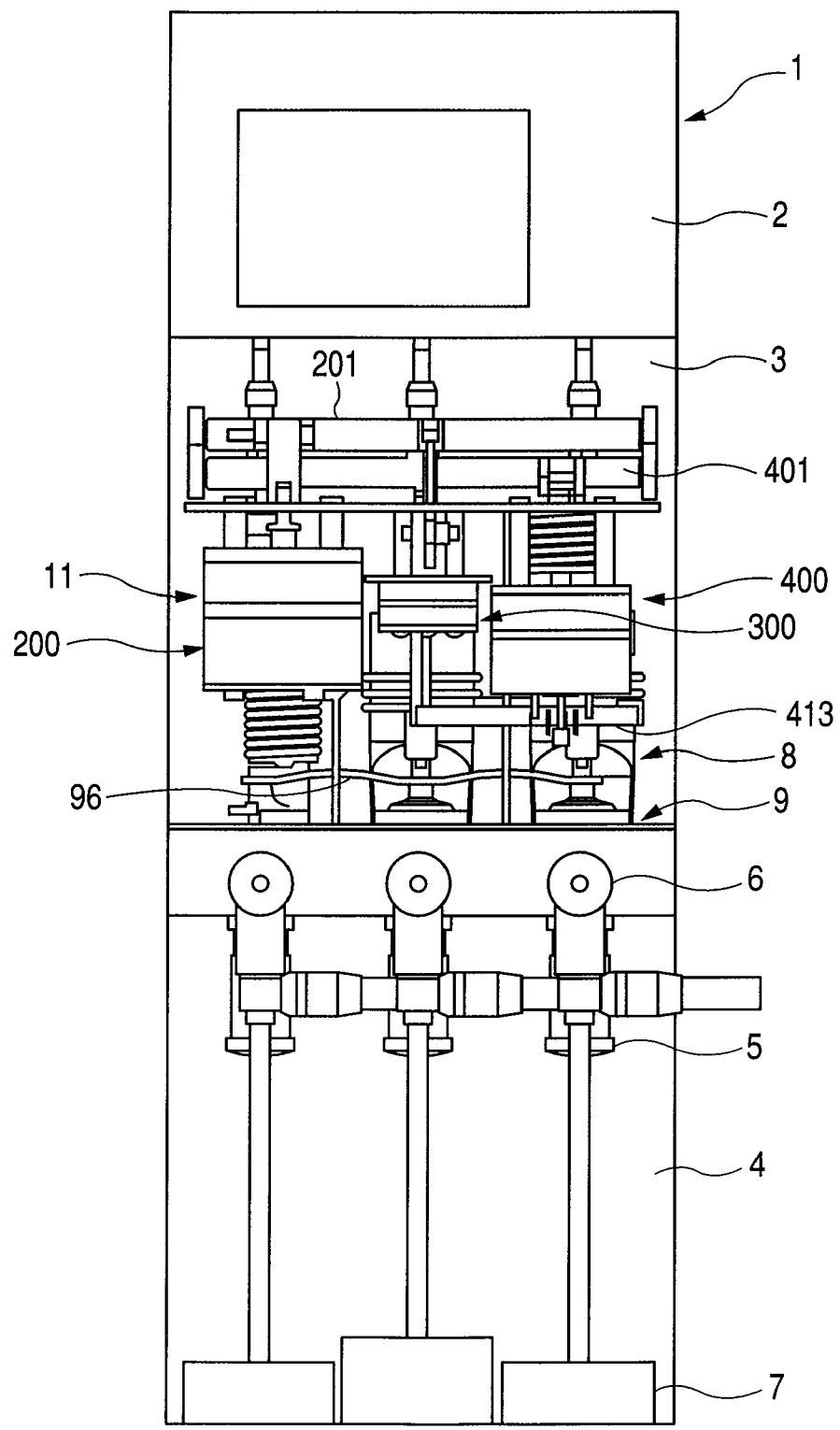
FIG. 2 is a front view showing the embodiment in which the vacuum insulated switchgear of the present invention is applied as the feeder panel.
Figure 3:
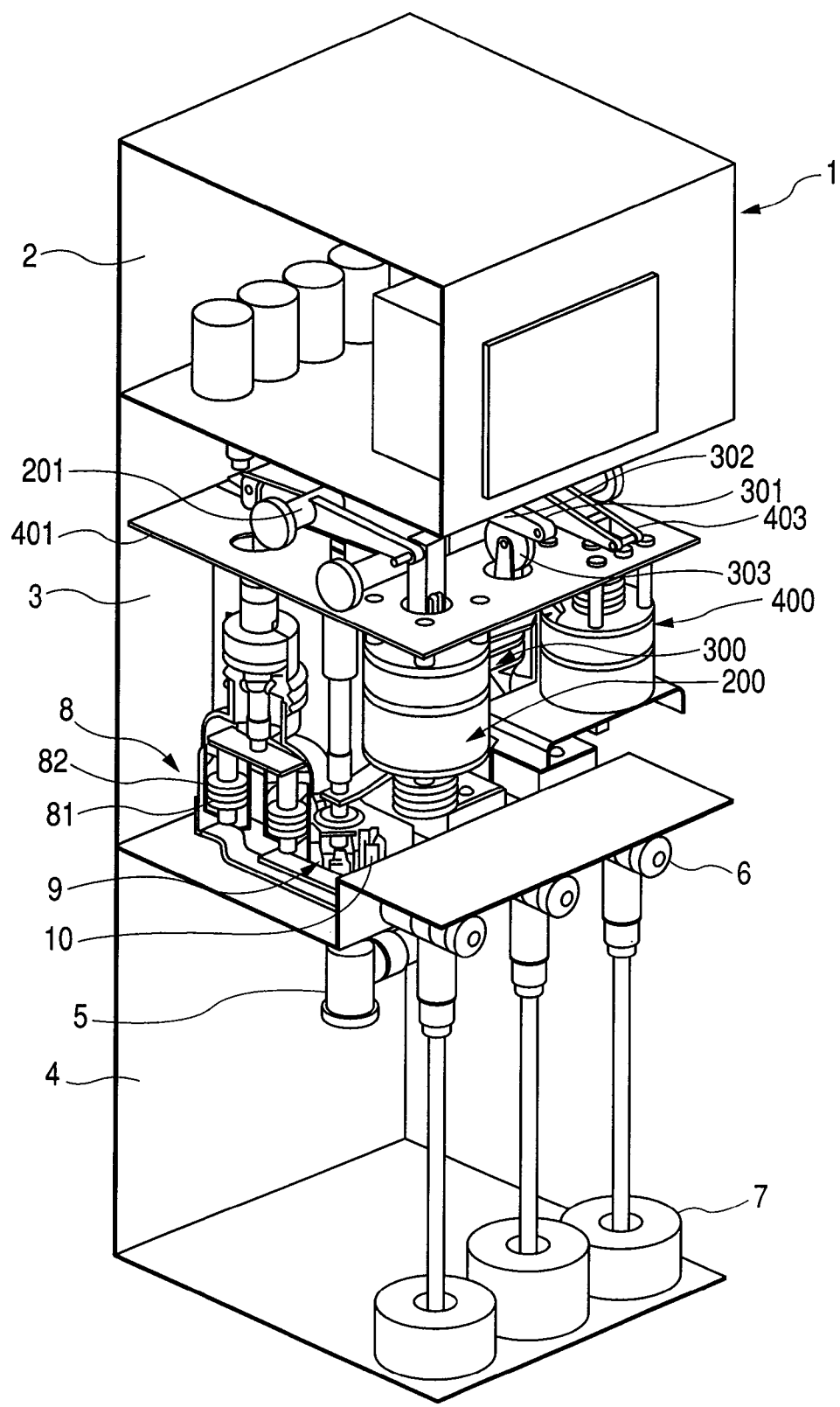
FIG. 3 is a perspective view showing the embodiment in which the vacuum insulated switchgear of the present invention is applied as the feeder panel.
Figure 4:
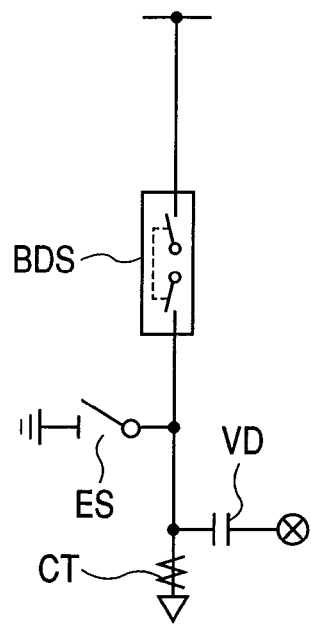
FIG. 4 is a circuit diagram showing the embodiment in which the vacuum insulated switchgear of the present invention is applied as the feeder panel.

FIGS. 1 to 3 are a side view, a front view, and a perspective view of an embodiment of the present invention in which the inventive vacuum insulated switchgear is used as a feeder panel. FIG. 4 is a diagram of an electric circuit in the vacuum insulated switchgear. The interior of a container 1 of the vacuum insulated switchgear in this embodiment is divided into a low-pressure control section 2, a high-pressure switch section 3, and a bus and cable section 4, when viewed from the top.

Disposed in the high-pressure switch section 3 are a vacuum double-break three-position type switch (vacuum double-break three-position type breaking and disconnecting switch (BDS)) 8, an earthing switch (ES) 9 having a vacuum closed container, a voltage detector (VD) 10, an operation device 11, and the like.

The vacuum double-break three-position type switch (BDS) 8, the earthing switch (ES) 9 having the vacuum closed container, and the voltage detector (VD) 10 disposed in the above-mentioned high-voltage switch section 3 are integrally formed by a molded resin portion 12 made of epoxy resin or the like, as shown in FIG. 1. Accordingly, the switching is unitized and reduced in size and weight. The unitized switching has an isolated-phase structure. Shielding layers are disposed between the phases, suppressing short-circuit faults. The outer surface of the molded resin portion 12 is earthed via a conductive coating material applied to its outer surface, ensuring safety for contact.

A bus-side cable head 5 is disposed in the bus and cable section 4, the bus-side cable head being formed by covering a bus-side conductor extending from the molded resin portion 12 of the switch 8 with a cable head solid insulating member. On the load side, a load-side cable head 6 is disposed similarly, the load-side cable head being formed by covering a load-side conductor extending from the molded resin portion 12 with a cable head solid insulating member. Bushings CT 7 and other components are also disposed.

The bus-side conductor and load-side conductor are gasless conductors insulated by a solid, ensuring its handling and safety. The voltage detector 10 also detects a corona generated due to reduction in the degree of vacuum in the vacuum container so that maintenance and inspection can be easily carried out.

Next, the structure of the unitized switching will be described in detail with reference to FIGS. 1 and 5. The vacuum double-break three-position type switch (BDS) 8 comprises a vacuum container 80 with an insulated cylinder 80a, two fixed contacts 81 disposed in the vacuum container 80, and two movable contacts 82 disposed in the vacuum container 80 capable of being in contact with or out of contact with the fixed contacts, achieving the double-break.

As shown in FIG. 1, a fixed contact 81 on the left is connected to a feeder 83, which constitutes the bus-side conductor in the molded resin portion 12. The bus-side conductor extends through the feeder 83 to the outside of the vacuum container 80 and the molded resin portion 12 covering the vacuum container 80, and connects to the conductor of the bus-side cable head 5 outside the molded resin portion 12. Another fixed contact 81 on the right is connected to a feeder 84, which constitutes the load-side conductor in the molded resin portion 12. The load-side conductor extends through the feeder 84 to the outside of the vacuum container 80 and the molded resin portion 12 covering the vacuum container 80, and connects to the conductor of the load-side cable head 6 outside the molded resin portion 12. The fixed contacts 81 on the right and left, the movable contacts 82, and their near periphery are covered with arc shields 90.

The movable contacts 82 are mutually linked by a movable conductor 85, which is reinforced by a metal, such as stainless steel, which is not annealed at high temperature. A vacuum insulation operation rod 86 is connected to the movable conductor 85. The vacuum insulation operation rod 86 is introduced out of the vacuum container 80 via a metal bellows 87, and linked to an air insulation operation rod 88. The air insulation operation rod 88 is linked to an operation rod 111 operated by the operation device 11.

Figure 5:
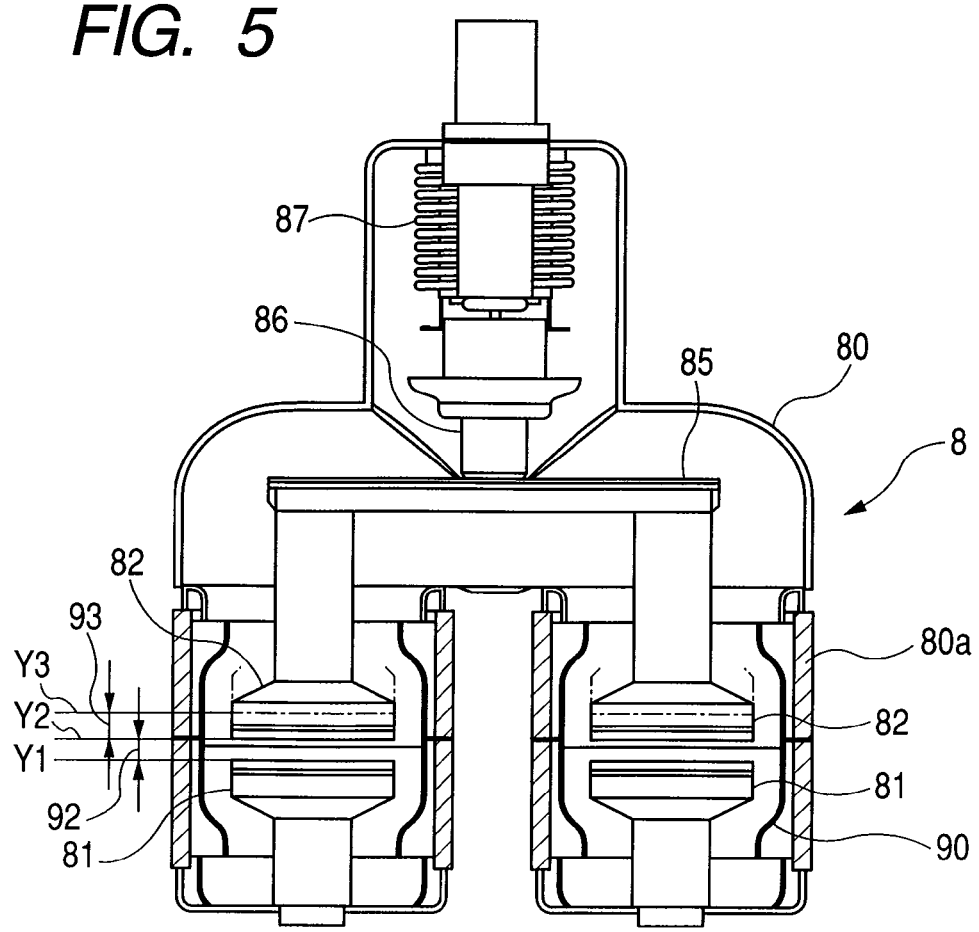
FIG. 5 is a longitudinal cross sectional view showing the structure of a vacuum double-break three-position type switch of the embodiment in which the vacuum insulated switchgear of the present invention.

Each movable contact 82 is driven via the operation rod 111 and stops at three positions Y1, Y2, and Y3 shown in FIG. 5; Y1 is a closed position for conduction, Y2 is an open position for shutting off current, and Y3 is a disconnecting position for ensuring safety for a check operator against a surge voltage caused by, for example, lightning.

As shown in FIG. 5, each movable contact 82 has a break gap g2 at the open position Y2, and a disconnecting gap g3 at the disconnecting position Y3. The disconnecting gap g3 is set to have a distance between the electrodes, the distance being almost twice the distance of the break gap g2. When the disconnecting gap g3 at a time of disconnection is set to have a distance almost twice the distance of the break gap g2 and a plurality of disconnecting gaps (in this example, two disconnecting gaps) in this way, multistage insulation becomes possible.

To achieve insulation coordination between the phases, solid insulation is applied between the phases, vacuum insulation is applied between the electrodes of the contacts, and the distance between the electrodes and the number of the electrodes are changed to set a relationship of "inter-phase insulation>inter-electrode insulation at a time of disconnection>inter-pole insulation at a time of current breaking>inter-pole insulation for the earthing switch". Then, at least, an accident can be suppressed to a single bus-to-ground fault and spread of the accident can be minimized.

The above-mentioned air insulation operation rod 88 is covered with a bellows 89 made of rubber or metal so as to be shielded from the air, as shown in FIG. 1. Accordingly, insulation reliability for prolonged use of the air insulation operation rod 88 is ensured.

The earthing switch (ES) 9 having the vacuum closed container comprises a vacuum container 91 having an insulation cylinder, a fixed contact 92 fixed in the vacuum container 91 and connected to the feeder 84, and a movable contact 93 disposed in the vacuum container 91 capable of being in contact with or out of contact with the fixed contact 92, as shown in FIG. 1.

A vacuum insulation operation rod 94 is linked to each movable contact 93. The vacuum insulation operation rod 94 is extends outwardly of the vacuum container 91 via a metal bellows 95, and linked to the insulation operation rod 112 for the earthing switch. The vacuum containers 80 and 91 and the operation rods 111 and 112 are made of, for example, stainless steel to improve their environmental resistance. The movable contacts 93 are mutually connected by a conductor 96, as shown in FIG. 2.

The operation device 11 performs switching to the closed position Y1 for conduction of the switch 8, the open position Y2 for shutting off current, and the disconnecting position Y3 for ensuring safety for a check operator against a surge voltage caused by, for example, lightning, and also turns on and off the earthing switch 9. The structure of the operation device 11 will be described in detail with reference to FIG. 6.

Components of the operation device 11 are fixed to a support plate 113 disposed in the high-voltage switch section 3. The operation device 11 generally comprises a first operation mechanism 200 for switching the positions of the movable contacts 82 of the switch 8 between the closed position Y1 and the open position Y2, a second operation mechanism 300 for switching the positions of the movable contacts 82 of the switch 8 between the open position Y2 and the disconnecting position Y3, and a third operation mechanism 400 for operating the movable contacts 93 of the earthing switch 9.

Figure 6:
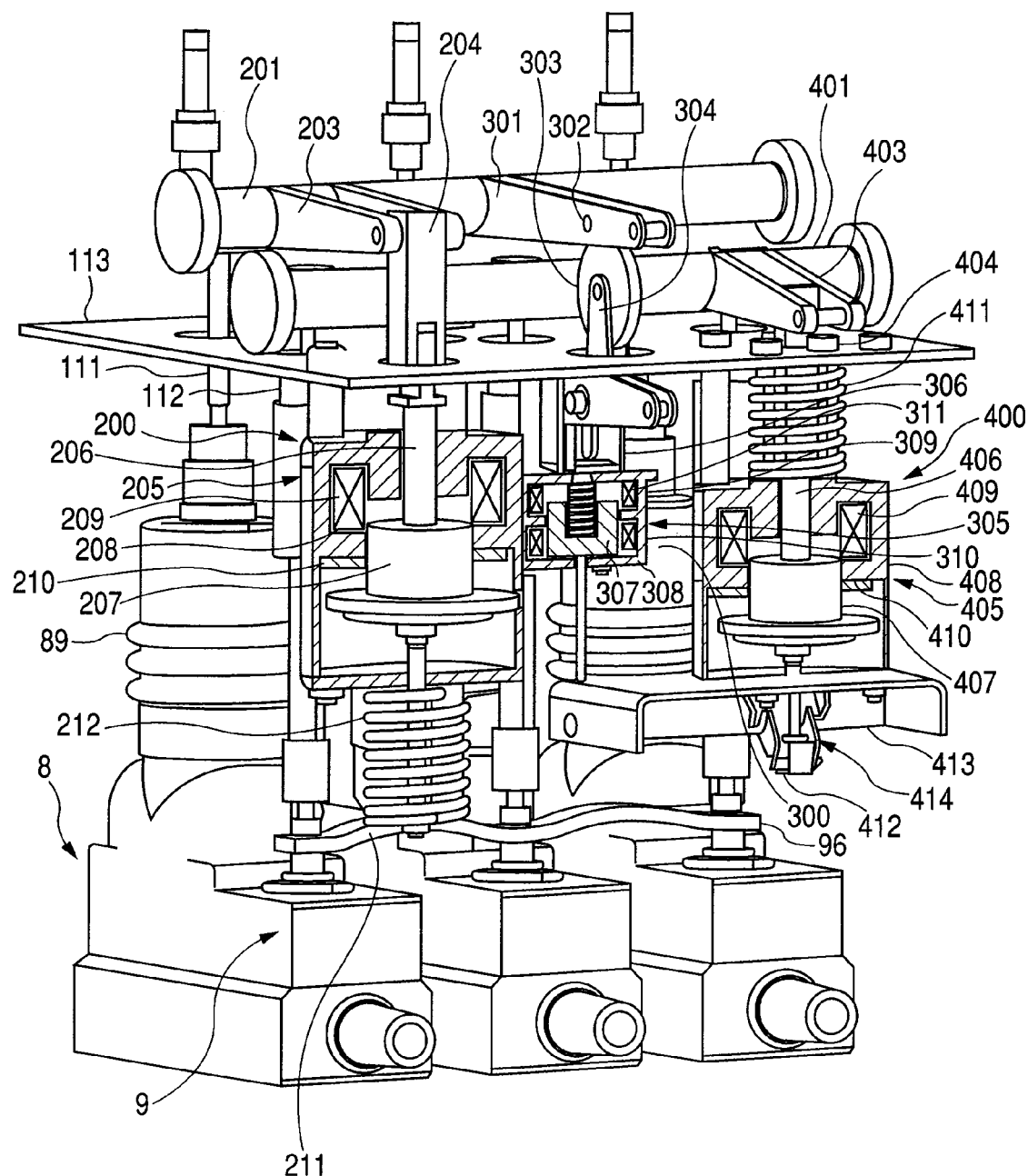
FIG. 6 is a perspective view for illustrating an operation of the vacuum insulated switchgear of the present invention.

First, the structure of the first operation mechanism 200 will be described with reference to FIGS. 1 and 6. In FIG. 6, a first shaft 201 is rotatably supported by the support plate 113. Three levers 202 are fixed to the first shaft 201 in the axial direction of the first shaft 201, as shown in FIG. 1. The distal end of each lever 202 is linked to the corresponding operation rod 111. A lever 203 is fixed to a position, opposite to the lever 202, on the first shaft 201.

A driving shaft 206 of an electromagnet 205 is linked to the lever 203 via a linking member 204. A movable iron core 207 having a T-shaped cross section is fixed to the driving shaft 206. A fixed iron core 208 fixed to the support plate 113 is disposed around this movable iron core 207. A coil 209 and a circular permanent magnet 210 are disposed inside the fixed iron core 208. A trip spring holder 211 is attached to the driving shaft 206 at its end opposite to the lever 203. A trip spring 212 is disposed between the trip spring holder 211 and the fixed iron core 208.

When the movable contact 82 is retained at the closed position Y1, the electromagnet 205 obtains a retention force against stored energy of the trip spring 212 and of a contact pressure spring (not shown) provided to the air insulation operation rod 88 by means of attraction of the coil 209 and permanent magnet 210. In particular, the attraction of the permanent magnet 210 achieves a so-called magnetic latch.

Next, the structure of the second operation mechanism 300 for switching the position of the movable contact 82 of the switch 8 between the open position Y2 and the disconnection position Y3 will be described with reference to FIG. 6. A lever 301 is fixed to a longitudinal middle portion of the first shaft 201 on the support plate 113. An interlock pin 302 is attached at the distal end of the lever 301. A roller 303 abuts the interlock pin 302. The roller 303 is rotatably disposed to one end of a crank lever 304. The crank lever 304 is rotatably supported on the lower surface of the support plate 113.

A driving shaft 306 of an electromagnet 305 is linked to the other end of the crank lever 304. A movable iron core 307 is fixed to the driving shaft 306. A fixed iron core 308 fixed to the support plate 113 is disposed around the movable iron core 307. Coils 309 and 310 are disposed vertically in the fixed iron core 308. A return spring 311 is disposed between the movable iron core 307 and an upper portion of the fixed iron core 308.

The above-mentioned electromagnet 305 energizes the coils 309 and 310 to move the movable iron core 307 vertically. This vertical movement causes the crank lever 304 to rotate. The rotation of the clank lever 304 then changes the abutment position between the interlock pin 302 and the roller 303 so as to prevent the lever 203 from rotating around the first shaft 201 or enables the lever 203 to rotate around the first shaft 201. Accordingly, it becomes possible to prevent the movable contact 82 of the switch 8 from moving from the open position Y2 to the disconnecting position Y3, retaining the movable contact 82 at the open position Y2, or to enable the movable contact 82 to move from the open position Y2 to the disconnecting position Y3. That is, this structure is a first interlock mechanism between the open position Y2 and disconnecting position Y3 of the movable contact 82 of the switch 8.

Next, the structure of the third operation mechanism 400 for operating the movable contact 93 of the earthing switch 9 will be described with reference to FIG. 6. A second shaft 401 is rotatably supported by the support plate 113. As shown in FIG. 1, three levers 402 are fixed to the second shaft 401 in the axial direction of the second shaft 401. The distal end of each lever 402 is linked to the corresponding operation rod 112. A lever 403 is fixed to a position, opposite to the lever 402, on the second shaft 401.

A driving shaft 406 of an electromagnet 405 is linked to the lever 403 via a linking member 404. The electromagnet 405 has a structure similar to that of the electromagnet 205 of the first operation mechanism 200; a movable iron core 407 having a T-shaped cross section is fixed to the driving shaft 406. A fixed iron core 408 fixed to the support plate 113 is disposed around the movable iron core 407. A coil 409 and a circular permanent magnet 410 are disposed inside the fixed iron core 408. A spring 411 for break is disposed between the fixed iron core 408 and the lower surface of the support plate 113.

A second interlock mechanism is disposed between the third operation mechanism 400 of the earthing switch 9 and the second operation mechanism 300 for switching the position of the movable contacts 82 of the switch 8 between the open position Y2 and the disconnecting position Y3.

In the second interlock mechanism, when the movable contact 82 in the switch 8 is at the disconnecting position Y3 for ensuring safety for a check operator against a surge voltage caused by, for example, lightning, the electromagnet 405 enables the movable contact 93 and fixed contact 92 in the earthing switch 9 to be closed. When the movable contact 82 in the switch 8 is at the open position Y2 for shutting off current, the electromagnet 405 disables the movable contact 93 and fixed contact 92 in the earthing switch 9 from being closed. When the movable contact 93 and fixed contact 92 of the earthing switch 9 are closed, the electromagnet 205 in the second operation mechanism 300 is made inoperable.

Specifically, the second interlock mechanism comprises a pin 412 provided at a lower end of the driving shaft 406 of the electromagnet 405 in the third operation mechanism 400, a shaft 413 provided parallel to the second shaft 401 below the electromagnet 305 in the second operation mechanism 300, a lever (not shown) provided on the shaft 413 and linked to a lower end of the driving shaft 306 of the electromagnet 305 in the second operation mechanism 300, and a lever 414 provided on the shaft 413 and engaged with the pin 412.

Next, operation in an embodiment in which the inventive vacuum insulated switchgear described above is used as a feeder panel will be described. When the movable contact 82 in the switch 8 is set at the open position Y2 for shutting off current, the lever 203 in the first operation mechanism 200 is given a clockwise rotary force (when viewed in FIG. 1) by a return force of the trip spring 212 in the first operation mechanism 200, with the first shaft 201 being used as a fulcrum.

Accordingly, the interlock pin 302 disposed at the distal end of the lever 301 in the second operation mechanism 300 abuts a peripheral upper surface of the roller 303, suppressing an additional clockwise rotary force by the return force of the trip spring 212. That is, a switchover from the open position Y2 for shutting off current to the disconnecting position Y3 for ensuring safety for a check operator against surge voltage caused by, for example, lightening is prevented.

Next, a switchover from the open position Y2 to the closed position Y1 (closing operation) by the first operation mechanism 200 will be described. When the coil 209 of the electromagnet 205 of the first operation mechanism 200 is energized, the driving shaft 206 moves upward (when viewed in FIG. 6). The upward movement of the driving shaft 206 causes the lever 202 to rotate counterclockwise (when viewed in FIG. 1) with the first shaft 201 being used as a fulcrum so as to move the movable contact 82 toward the closed position Y1. In this closed state, the trip spring 212 and contact pressure spring store energy to prepare for opening the electrodes.

Because of the closing operation, the interlock pin 302 is separated from a peripheral surface of the roller 303. The roller 303 stays at its initial position by the return spring 311 in the second operation mechanism 300. As described above, in view of needs for enhancing safety, the second operation mechanism 300 is a mechanical interlock mechanism so that the disconnecting operation by the first operation mechanism 200 is disabled when the switch 8 is in the closed state. That is, "the disconnecting operation is disabled when the movable contact is at the closed position" is achieved, which is one of mechanical interlocks between the breaker and disconnecting switch.

Next, a switchover from the closed position Y1 to the open position Y2 (electrode opening operation) by the first operation mechanism 200 will be described. When the coil 209 of the electromagnet 205 in the first operation mechanism 200 is energized in a direction opposite to the direction in the closing operation so as to eliminate the magnetic flux of the permanent magnet 210, the driving shaft 206 moves downward (when viewed in FIG. 1) by stored energy of the trip spring 212 and contact pressure spring. This downward movement of the driving shaft 206 attempts to cause the lever 301 to rotate clockwise (when viewed in FIG. 1) via the lever 203 and first shaft 201. However, this clockwise rotation of the lever 301 is prevented by abutment between the interlock pin 302 and the peripheral upper surface of the roller 303 in the second operation mechanism 300. As a result, the movable contacts 82 of the switch 8 can be retained at the open position Y2.

Next, a switchover from the open position Y2 to the disconnecting position Y3 (disconnection operation) by the second operation mechanism 300 will be described. When the switch 8 is open, if the coil 309 above the electromagnet 305 in the second operation mechanism 300 is energized, the driving shaft 306 moves upward against the return spring 311. This upward movement of the driving shaft 306 causes the roller 303 to rotate counterclockwise (when viewed in FIG. 1) via the crank lever 304. This counterclockwise rotation of the roller 303 then causes an abutment position between the roller 303 and the interlock pin 302 to move downward. As a result, the operation rods 111 move upward via the lever 301, first shaft 201, and lever 202, and the movable contact 82 of the switch 8 moves to the disconnecting position Y3.

In the disconnected state described above, the movable iron core 207 of the electromagnet 205 in the first operation mechanism 200 is positioned below the permanent magnet mount 210. Accordingly, even if the coil 209 of the electromagnet 205 in the first operation mechanism 200 is energized in the disconnected state, there is almost no magnetic flux passing through the movable iron core 207, generating no attractive force. That is, "closing operation is made disabled when the movable contact is at the disconnected position" is achieved, which is a mechanical interlock between the breaker and disconnecting switch.

Next, a switchover from the disconnected position Y3 to the open position Y2 by the second operation mechanism 300 will be described. In the disconnected state, when the coil 310 below the electromagnet 305 in the second operation mechanism 300 is energized, the driving shaft 306 moves upward and the crank lever 304 rotates clockwise. The roller 303 then pushes upward the interlock pin 302 abutting the roller 303. Accordingly, the movable contact 82 of the switch 8 moves to the open positions Y2.

When the movable contact 82 of the switch 8 is at the open position Y2 for shutting off current, the lever 414 in the second interlock mechanism engages the pin 412 disposed at the lower end of the driving shaft 406 of the electromagnet 405 in the third operation mechanism 400. Accordingly, the electromagnet 405 prevents the movable contact 93 of the earthing switch 9 from being closed.

When the fixed contact 92 and movable contact 93 of the earthing switch 9 are closed, the lever 414 in the second interlock mechanism engages the pin 412 disposed at the lower end of the driving shaft 406 of the electromagnet 405. Accordingly, the operation by the second operation mechanism 300 is disabled. Furthermore, when the movable contacts 82 of the switch 8 are at the disconnected position Y3 for ensuring safety for a check operator against surge voltage caused by, for example, lightening, the lever 414 in the second interlock mechanism enables movement of the pin 412 disposed at the lower end of the driving shaft 406 of the electromagnet 405. Accordingly, the third operation mechanism 400 can close the earthing switch 9.

In the embodiment described above, the rotatable roller 303 is used in the second operation mechanism 300. The roller 303 can be a partially-circular cam. The first operation mechanism 200 and third operation mechanism 400 can be repositioned appropriately. Although the first operation mechanism 200 uses a solenoid operation method, it can also use other operation methods such as an electrical spring method.

Figure 7:
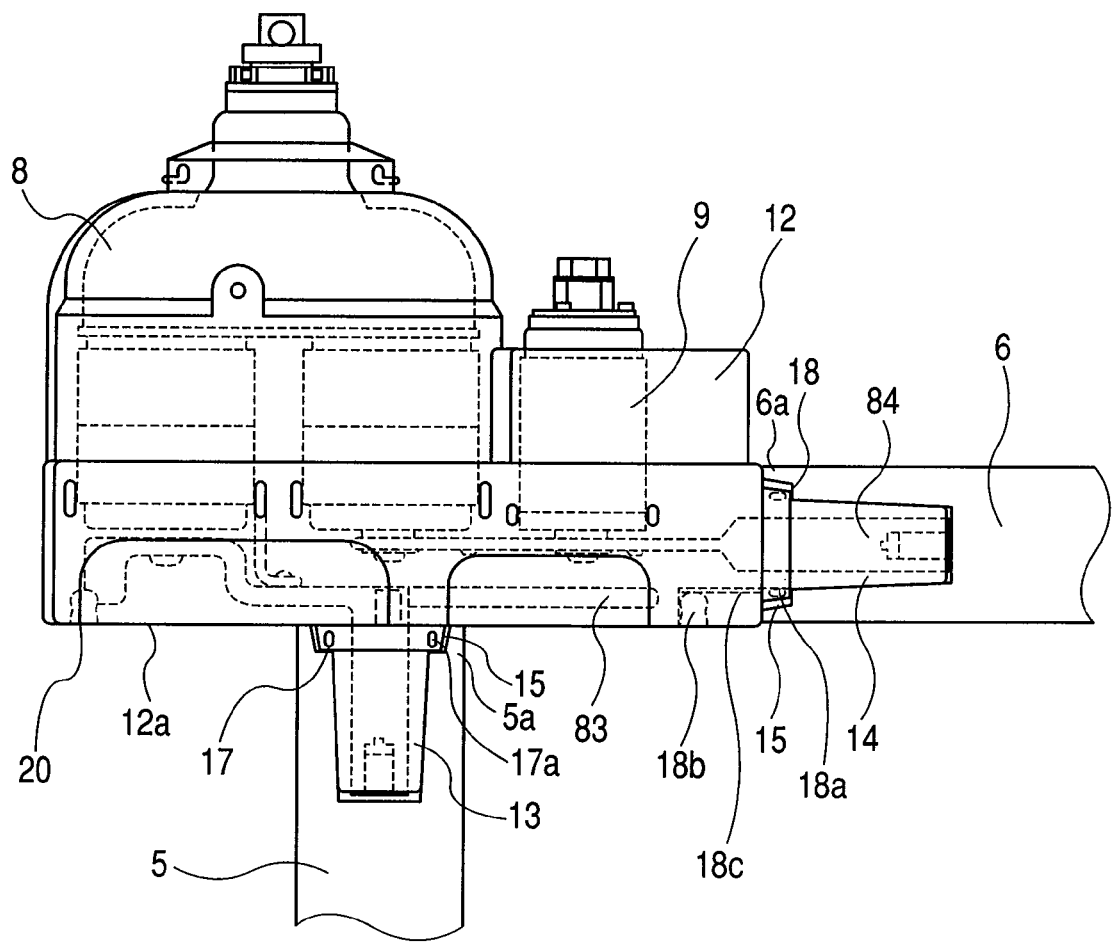
FIG. 7 is a cross sectional view of the molded vacuum double-break three-position type switch and an earthing switch of the embodiment in which the vacuum insulated switchgear of the present invention.

The inventive characteristic portion of the vacuum insulated switchgear will be described with reference to FIGS. 7 to 9. FIG. 7 is a cross sectional view of the molded vacuum double-break three-position type switch 8 and earthing switch 9. As described above, the feeder 83 connected to the fixed contact 81 on the left side of the switch 8 constitutes the bus-side conductor, and the feeder 84 connected to the fixed contact 81 on the right side constitutes the load-side conductor. These conductors form the main circuit in the molded resin portion 12.

A bus-side bushing 13 covering the bus-side conductor 83 is provided at the pulled-out portion of the vacuum container 80 for the bus-side conductor 83 and the molded resin portion 12 covering the vacuum container 80. The bus-side bushing 13 is formed integrally with the molded resin portion 12, and tapered; its diameter is gradually reduced from the root toward the distal end. Similarly, a load-side bushing 14 covering the load-side conductor 84 is provided at the pulled-out portion of the vacuum container 80 for the load-side conductor 84 and the molded resin portion 12 covering the vacuum container 80. The load-side bushing 14 is formed integrally with the molded resin portion 12, and tapered; its diameter is gradually reduced from the root toward the distal end.

As shown in FIG. 7, the bus-side bushing 13 is covered with a cable head solid insulating material 5a that covers the conductor of the bus-side cable head 5, and the load-side bushing 14 is covered with a cable head solid insulating material 6a that covers the conductor of the load-side cable head 6, the outer surfaces of these cable head solid insulating materials 5a, 6a being earthed. That is, the cable head solid insulating materials 5a, 6a, the outer surfaces of which are earthed, cover the bus-side bushing 13 and load-side bushing 14.

Accordingly, as shown in FIG. 7, voids 15 are generated on the interface between the outer surface of the bus-side bushing 13 and the inner surface of the corresponding cable head solid insulating material 5a and the interface between the outer surface of the load-side bushing 14 and the inner surface of the corresponding cable head solid insulating material 6a. When current flows in the conductors, a high electric field is applied to the voids 15 and thereby dielectric breakdown may finally occur.

When the bus-side conductor is considered as a central axis, the bus-side bushing 13, the void 15, and bus-side cable head 5 are radially disposed in that order. Similarly, when the load-side conductor is considered as a central axis, the load-side bushing 14, the void 15, and load-side cable head 6 are radially disposed in that order. Since the outer surface of the cable head solid insulating material 5a, 6a is earthed, the void 15 is positioned between the applied high electric field and the earthed potential of the outer surface of the cable head solid insulating material 5a, 6a and thus the high electric field is applied to the void 15. Accordingly, partial discharge occurs on the void 15, deteriorating the bushings 13 and 14 or the cable head insulating materials. This may cause dielectric breakdown.

When voids occur on the interface between a bushing and a cable head solid insulating material as in this embodiment, a high electric filed is applied to particularly a void at a position opposite to the distal end of the cable head solid insulating material, in other words, a void on the interface between the root of the bushing and the cable head solid insulating material. Then, dielectric breakdown may occur from the void.

To address the above problem, conductive members 17 and 18, which are earthed, are respectively embedded into the bus-side bushing 13 and load-side bushing 14 in this embodiment. In other words, the conductive member 17 is disposed between the conductor and the void 15 on the interface between the bus-side bushing 13 and the cable head solid insulating material 5a, and the conductive member 18 is also similarly disposed between the conductor and the void 15 on the interface between the load-side bushing 14 and the cable head solid insulating material 6a.

Figure 8:
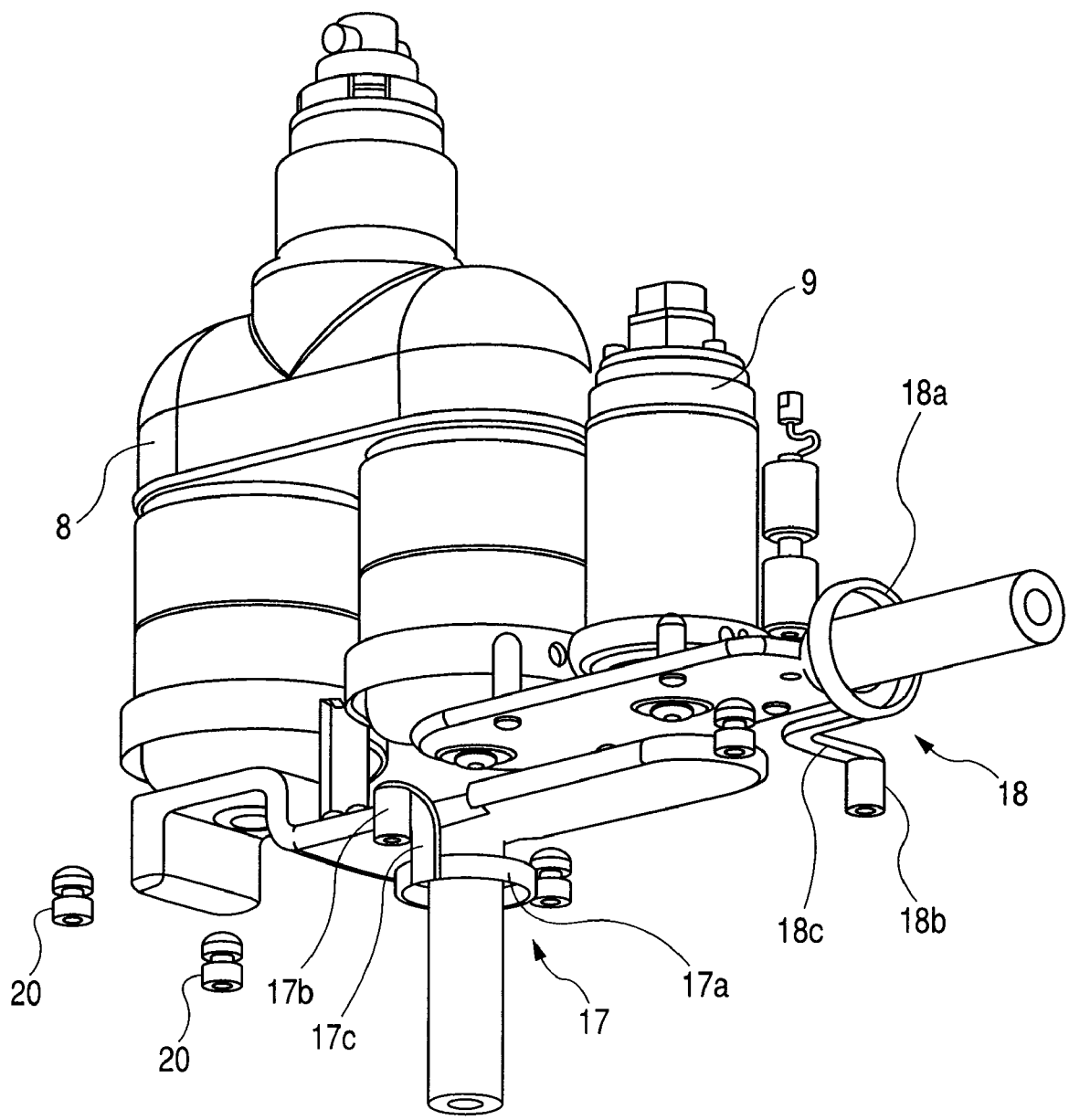
FIG. 8 is a perspective view showing only components in a molded resin portion of the embodiment in which the vacuum insulated switchgear of the present invention.

FIG. 8 is a perspective view showing only components in the molded resin portion 12. Specifically, as shown in FIGS. 7 and 8, the conductive member 17 is embedded like a ring into the conductor at the root of the bushing 13, and conductive member 18 is also similarly embedded at the root of the load-side bushing 14. In other words, the conductive members 17 and 18 are respectively embedded at positions opposite to the distal ends of the cable head solid insulating materials 5a, 6a in the bushings 13 and 14. The conductive member 17 comprises a ring 17a, an earthed portion 17b, and a bridge 17c for connecting the ring 17a and earthed portion 17b together. The conductive member 18 comprises a ring 18a, an earthed portion 18b, and a bridge 18c for connecting the ring 18a and earthed portion 18b together. Screw holes are formed in the earthed portions 17b and earthed portion 18b.

As described above, a conductive coating is applied to the outer surface of the molded resin portion 12 to form an earthed conductive layer 12a. The earthed portions 17b and 18b of the conductive members 17 and 18 are fixed to the conductive layer 12a by means of screws, so the conductive members 17 and 18 each have a ground potential.

On the load side, for example, load-side bushing 14, the conductive member 18, void 15, and the solid insulating material 6a of the load-side cable head 6 are radially disposed around the load-side conductor in that order. Accordingly, the high electric field is applied only to the bushing between the load-side conductor and the earthed conductive member, and the electric field applied to the void 15 can be alleviated, the void 15 being between the earthed potential of the conductive member 18 and the earthed potential of the outer surface of the solid insulating material 6a of the load-side cable head 6. As a result, it becomes possible to suppress partial discharge on the void 15, which is caused by the high electric field, and also suppress deterioration and dielectric breakdown of the load-side bushing 14 and the solid insulating material 6a of the load-side cable head 6, which are caused by the partial discharge.

In a variation of the present invention, to form a potential measurement terminal, one of the conductive members 17 and 18 embedded on the bus side and load side is connected to the conductive layer 12a, and the other conductive member 17 or 18 is not connected to the conductive layer 12a so that it has a floating potential.

Figure 9:
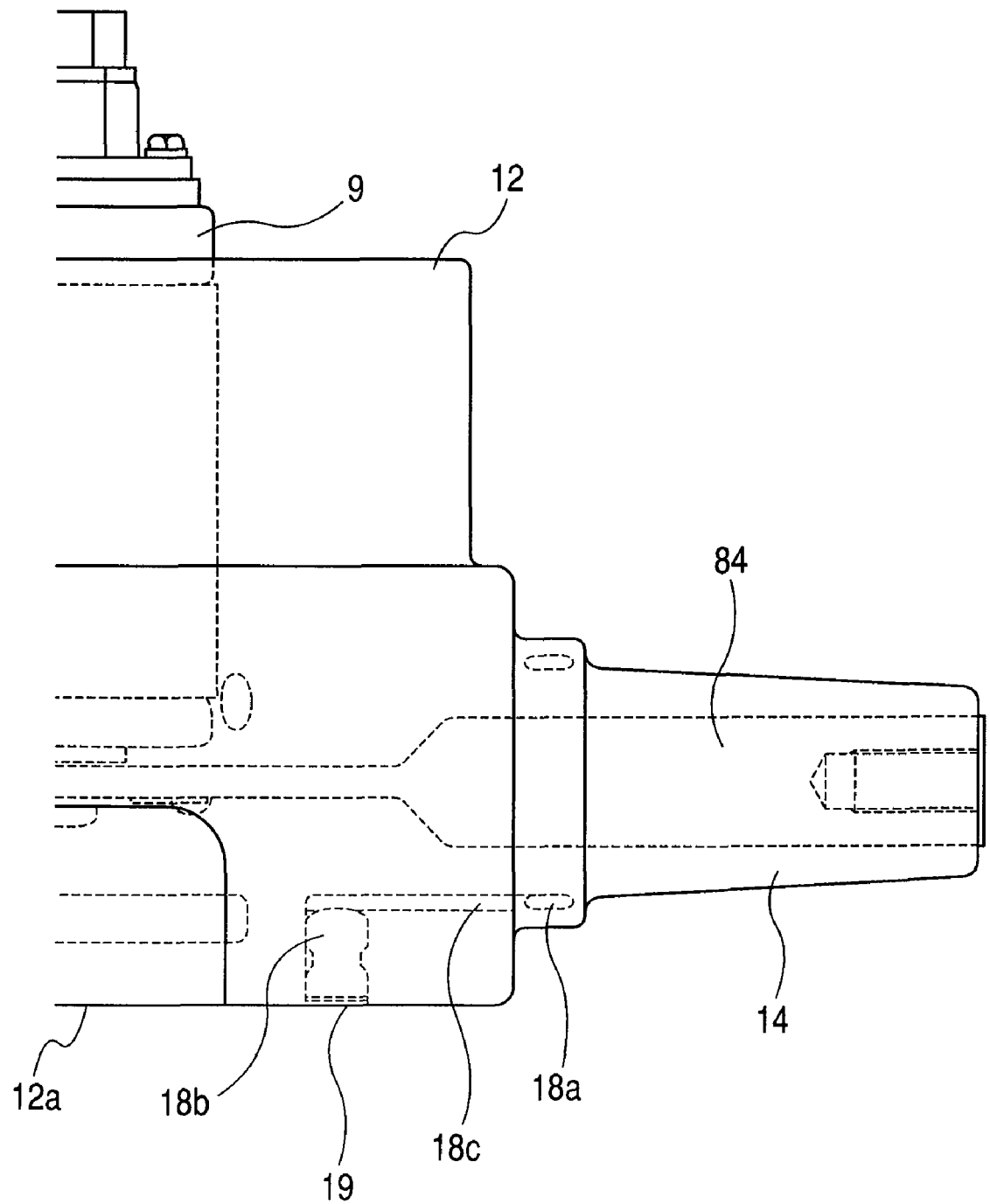
FIG. 9 shows a partial drawing for variation of the embodiment in which the vacuum insulated switchgear of the present invention.

When the conductive member 18 embedded into the load-side bushing 14 is used as the potential measurement terminal, the conductive member 18 is kept from being earthed so that it has a floating potential by, for example, placing an insulting plate 19 between the earthed portion 18b of the conductive member 18 and the outer surface of the molded resin portion 12, as shown in FIG. 9.

The conductive member 18 having the floating potential does not generate a voltage when electrically isolated from the conductor and generates a voltage when electrically connected to the conductor. When, for example, the voltage at the potential measurement terminal is measured or a light emitting diode (LED) or the like is connected to the terminal, it can be easily determined whether current is flowing in the conductor.

Since the potential of the potential measurement terminal is sufficiently lower than the voltage applied to the conductor, the effect of suppressing a high electric field from being applied to the void 15 and also suppressing dielectric breakdown as described above can also be given. Accordingly, the specific terminal (voltage detector 10) for determining whether current is flowing in the conductor is not required, so dielectric breakdown is suppressed and the number of components can be reduced.

The switching portion integrally formed with the molded resin portion 12 is fixed to the container by screwing a fixed terminal 20 and the earthed portions 17b and 18b of the conductive members 17 and 18. Since a high electric field is easily generated on the interface between the root of the bushing and the cable head, a case in which a conductive member is embedded into each bushing has been described in this embodiment. However, this is not a limitation; the conductive member can be embedded so as to alleviate the high electric field applied to the void according to, for example, the shapes of the solid insulating materials of the bushing and cable head.

Figure 10:
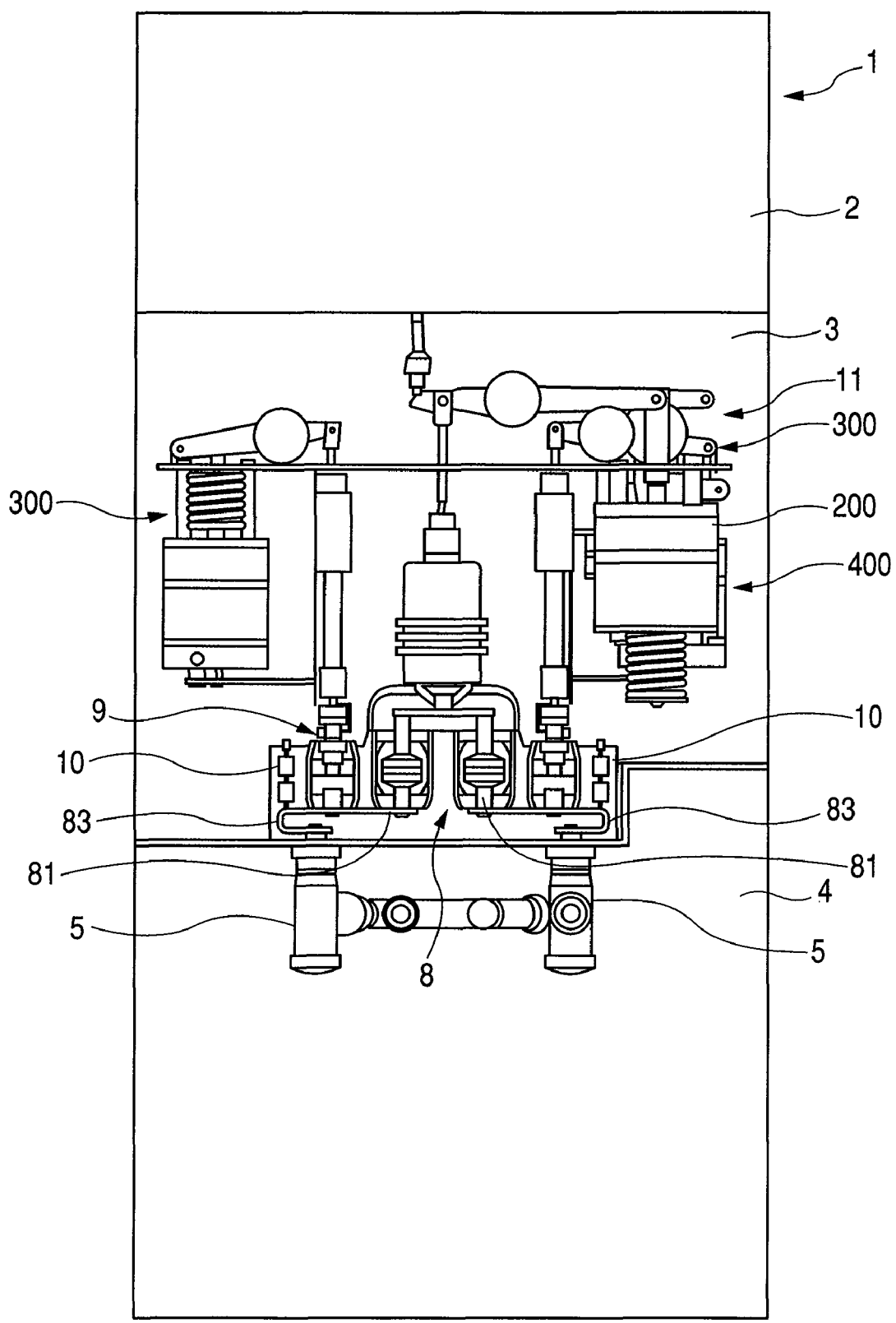
FIG. 10 is a side view showing another embodiment in which the vacuum insulated switchgear of the present invention is applied as a bus sectionalizing panel.
Figure 11:
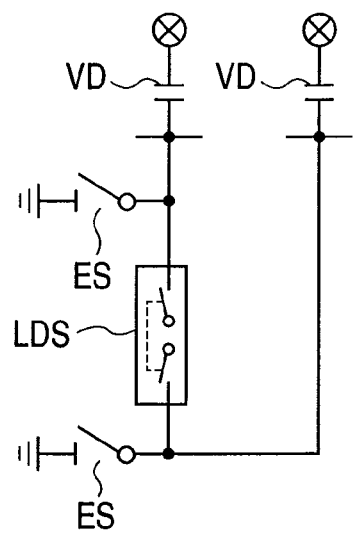
FIG. 11 is a circuit diagram showing the other embodiment in which the vacuum insulated switchgear of the present invention is applied as the bus sectionalizing panel.

FIGS. 10 and 11 illustrate another embodiment in which the vacuum insulated switchgear according to the present invention is applied as a bus sectionalizing panel; FIG. 10 is a side view of the embodiment in which the vacuum insulated switchgear according to the present invention is applied as a bus sectionalizing panel, and FIG. 11 is a diagram of an electric circuit in it.

In this embodiment, the vacuum double-break three-position type switch 8 is used as a vacuum double-break three-position type load breaking and disconnecting switch (LDS). The fixed contacts 81 of the switch 8 are connected to the bus-side cable heads 5 by use of the feeders 83. The earthing switch 9 is connected to each feeder 83.

Figure 12:
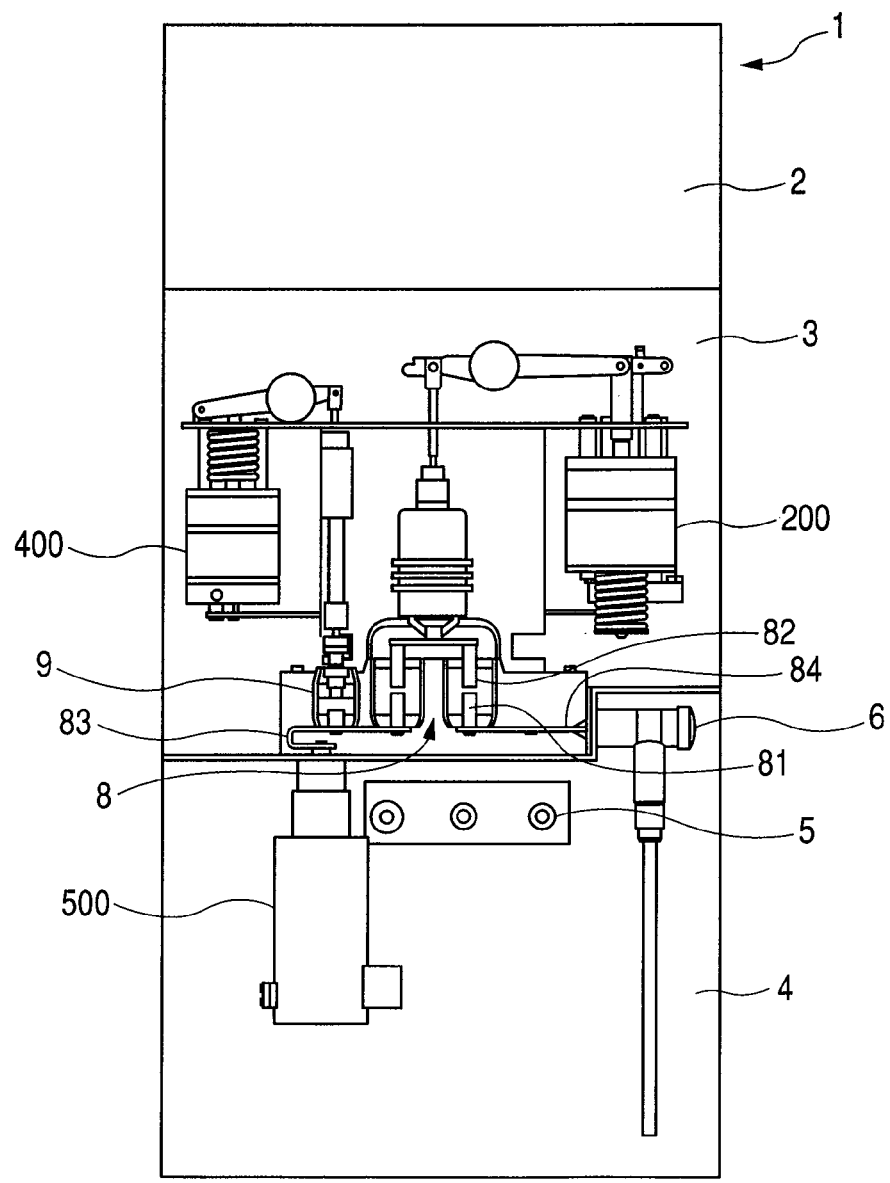
FIG. 12 is a side view showing another embodiment in which the vacuum insulated switchgear of the present invention is applied as a feeder instrument panel.
Figure 13:
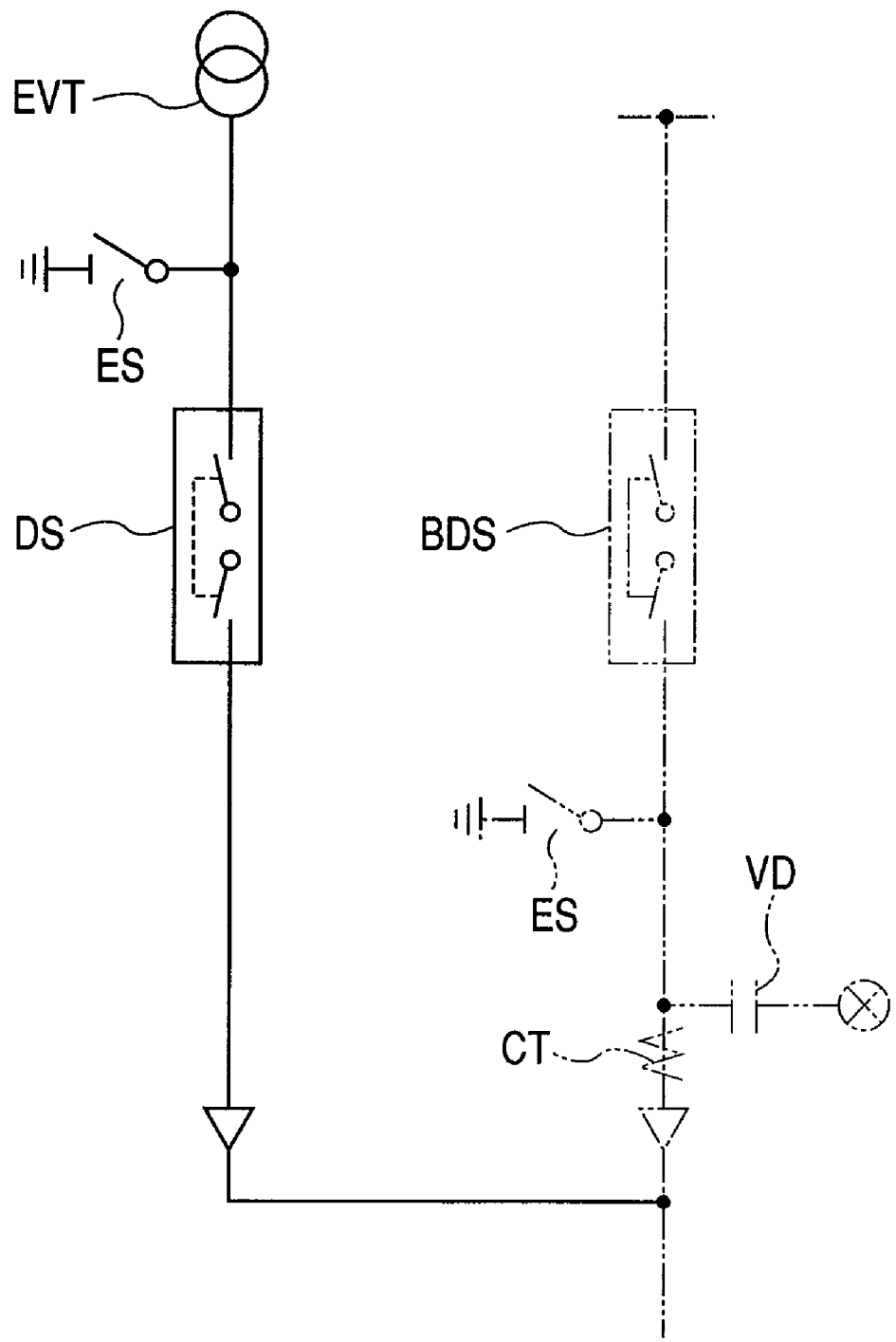
FIG. 13 is a circuit diagram showing the other embodiment in which the vacuum insulated switchgear of the present invention is applied as the feeder instrument panel.

FIGS. 12 and 13 illustrate another embodiment in which the vacuum insulated switchgear according to the present invention is applied as a feeder instrument panel; FIG. 12 is a side view of the embodiment in which the vacuum insulated switchgear according to the present invention is applied as a feeder instrument panel, and FIG. 13 is a diagram of an electrical circuit in it.

In this embodiment, the vacuum double-break three-position type switch 8 is used as a vacuum disconnecting switch (DS). One (left side in FIG. 12) of the fixed contacts 81 of the switch 8 is connected to a single phase coil type voltage transformer 500 in the bus and cable section 4 by use of the feeder 83, and the earthing switch 9 is connected to the feeder 83.

Figure 14:
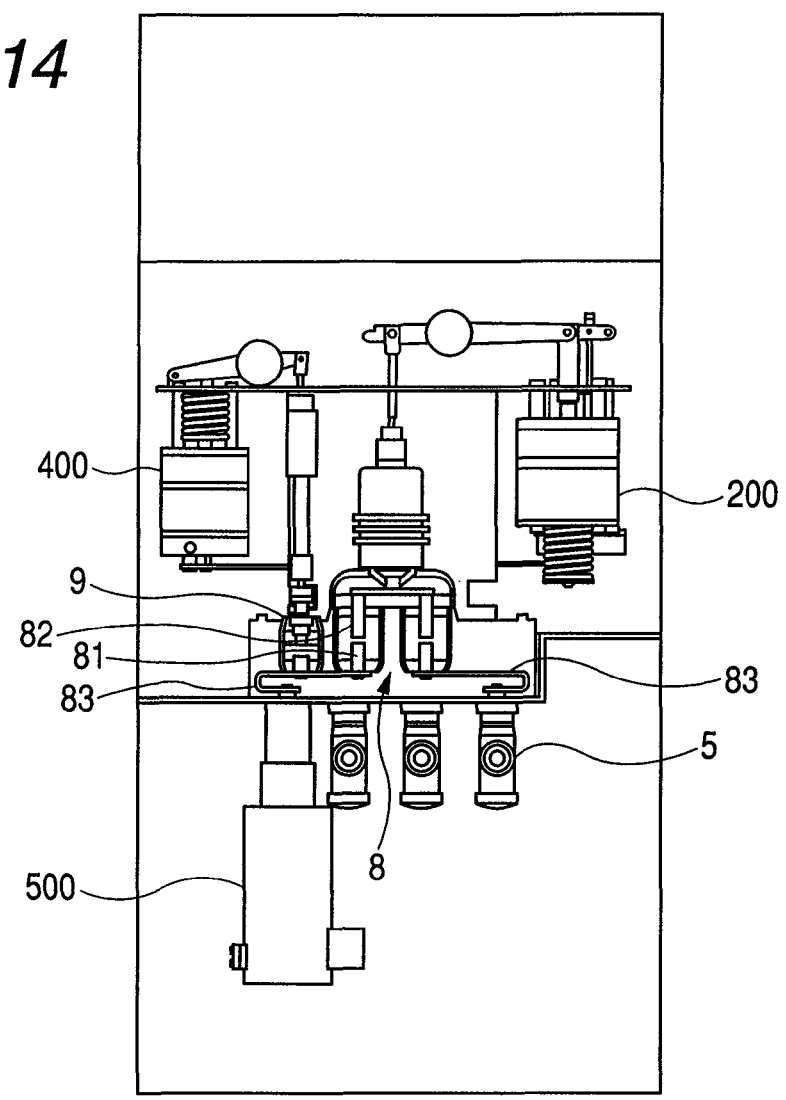
FIG. 14 is a side view showing another embodiment in which the vacuum insulated switchgear of the present invention is applied as a bus instrument panel.
Figure 15:
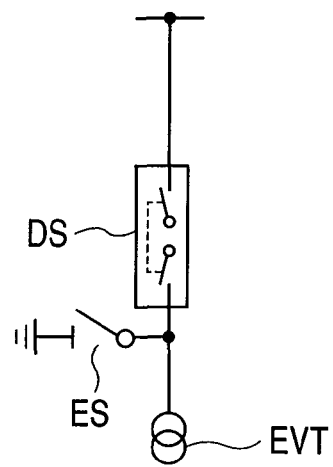
FIG. 15 is a circuit diagram showing the other embodiment in which the vacuum insulated switchgear of the present invention is applied as the bus instrument panel.

FIGS. 14 and 15 illustrate another embodiment in which the vacuum insulated switchgear according to the present invention is applied a bus instrument panel. FIG. 14 is a side view of the embodiment in which the vacuum insulated switchgear according to the present invention is applied as a bus instrument panel, and FIG. 15 is a diagram of an electrical circuit in it.

In this embodiment, the vacuum double-break three-position type switch 8 is used as a vacuum disconnecting switch (DS). One (left side in FIG. 14) of the fixed contacts 81 of the switch 8 is connected to the single phase coil type voltage transformer 500 in the bus and cable section 4 by use of one of the feeders 83. The other (right side of FIG. 14) of the fixed contacts 81 of the switch 8 is connected to the solid insulation bus 5 by use of the other of the feeders 83. The earthing switch 9 is connected to the one of the feeders 83.

According to the embodiments of the present invention described above, since the vacuum double-break three-position type switch can be used as the breaking and disconnecting switch or disconnecting switch, the present invention can flexibly respond to various requests of a user. The present invention also achieves excellent handling and upward scalability.

According to the embodiments of the present invention described above, the structure of the vacuum double-break three-position type switch enables the breaking portion and disconnecting portion to be duplicated, increasing their reliability.

According to the embodiments of the present invention described above, since the primary circuit has a complete isolated-phase structure, short-circuit faults can be minimized. Since the switch has a double insulation structure achieved by vacuum and a mold, ground faults due to a vacuum leak can be avoided. The strength of insulation in the switch is as follows: inter-phase insulation>inter-electrode insulation at a time of disconnection>inter-pole insulation at a time of current breaking>inter-pole insulation for the earthing switch. An accident can then be suppressed to at least a single line-to-ground fault. Spread of the accident can be minimized. Because of the above reasons and others, the present invention is excellent in safety.

What is claimed is:

1. A vacuum insulated switchgear having a vacuum container, a fixed contact disposed in the vacuum container, a movable contact disposed in the vacuum container capable of being in contact with or out of contact with the fixed contact, a driving mechanism for driving the movable contact in directions to contact with and out of contact with the fixed contact, a resin portion molded around the vacuum container, an insulative bushing for covering a pulled-out portion of a conductor connected to the fixed contact and for extending from the molded resin portion, and a cable head insulating member for covering a conductor of a cable head connected to the conductor at the pulled-out portion and an outer surface of the cable head insulating member being earthed, characterized in that:

an earthed conductive member is embedded at least at a position opposite to an end of the cable head insulating member in the bushing.

2. The vacuum insulated switchgear according to claim 1, wherein:
the conductive member is one of a first conductive member and a second conductive member, and the bushing is one of a first bushing for a bus-side conductor and a second bushing for a load-side conductor, the first conductive member being embedded into the first bushing and a second conductive member being embedded into the second bushing.

3. The vacuum insulated switchgear according to claim 2, wherein:
an earthed conductive layer is formed on an outer surface of the molded resin portion; and
the first conductive member embedded into the first bushing for the bus-side conductor and the second conductive member embedded into the second bushing for the load-side conductor are connected to the conductive layer.

4. The vacuum insulated switchgear according to claim 2, wherein:
an earthed conductive layer is formed on an outer surface of the molded resin portion; and
one of the first conductive member embedded into the first bushing for the bus-side conductor and the second conductive member embedded into the second bushing for the load-side conductor is connected to the conductive layer, and a remaining conductive member embedded into the first bushing or second bushing is used as a potential measuring terminal by not to be connected to the conductive layer so that the remaining conductive member has a floating potential.

5. The vacuum insulated switchgear according to claim 1, wherein:
two fixed contacts are disposed and two movable contacts are disposed for the two fixed contacts capable of being in contact with or out of contact with the fixed contacts; and
the driving mechanism moves the two movable contacts together to bring the two movable contacts into contact with the two fixed points simultaneously or out of contact with the two fixed points simultaneously.

6. The vacuum insulated switchgear according to claim 1, wherein an earthing switch is embedded into the molded resin portion.

7. A vacuum insulated switchgear having a vacuum container, a fixed contact disposed in the vacuum container, a movable contact disposed in the vacuum container capable of being in contact with or out of contact with the fixed contact, a driving mechanism for driving the movable contact in directions to contact with and out of contact with the fixed contact, a molded resin portion molded around the vacuum container, an insulative bushing for covering a pulled-out portion of a conductor connected to the fixed contact and for extending from the molded resin portion, and a cable head insulating member for covering a conductor of a cable head connected to the conductor at the pulled-out portion and an outer surface of the cable head insulating member being earthed,
characterized in that:
an earthed conductive member is embedded like a ring at a root of the bushing on a molded resin portion side.

8. The vacuum insulated switchgear according to claim 7, wherein:
the conductive member is one of a first conductive member and a second conductive member, and the bushing is one of a first bushing for a bus-side conductor and a second bushing for a load-side conductor, the first conductive member being embedded into the first bushing and a second conductive member being embedded into the second bushing.

9. The vacuum insulated switchgear according to claim 8, wherein:
an earthed conductive layer is formed on an outer surface of the molded resin portion; and
the first conductive member embedded into the first bushing for the bus-side conductor and the second conductive member embedded into the second bushing for the load-side conductor are connected to the conductive layer.

10. The vacuum insulated switchgear according to claim 8, wherein:
a conductive layer, which is earthed, is formed on an outer surface of the molded resin portion; and
one of the first conductive member embedded into the first bushing for the bus-side conductor and the second conductive member embedded into the second bushing for the load-side conductor is connected to the conductive layer, and a remaining conductive member embedded into the first bushing or second bushing is used as a potential measuring terminal by not to be connected to the conductive layer so that the remaining conductive member has a floating potential.

* * * * *

UNITED STATES PATENT AND TRADEMARK OFFICE
CERTIFICATE OF CORRECTION

PATENT NO. : 8,035,054 B2  
APPLICATION NO. : 12/339323  
DATED : October 11, 2011  
INVENTOR(S) : Ozawa et al.

Page 1 of 1

It is certified that error appears in the above-identified patent and that said Letters Patent is hereby corrected as shown below:

On title page

Please add the Foreign Application Priority Data to read as follows:

Item --(30)    Foreign Application Priority Data

Dec. 21, 2007   (JP)           2007-331114--

Signed and Sealed this
Seventeenth Day of January, 2012

David J. Kappos
*Director of the United States Patent and Trademark Office*